US010933844B2

(12) United States Patent
Spindler et al.

(10) Patent No.: US 10,933,844 B2
(45) Date of Patent: Mar. 2, 2021

(54) VEHICLE TIRE INFLATION COMPRESSOR FOR POWERED DATA PORTS

(71) Applicant: ILLINOIS TOOL WORKS INC., Glenview, IL (US)

(72) Inventors: Martin Patrick Spindler, Herdwangen (DE); William Craig Keller, Medway, MA (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 16/432,313

(22) Filed: Jun. 5, 2019

(65) Prior Publication Data
US 2019/0389435 A1  Dec. 26, 2019

Related U.S. Application Data

(60) Provisional application No. 62/688,204, filed on Jun. 21, 2018.

(51) Int. Cl.
*B60S 5/04* (2006.01)
*B29C 73/02* (2006.01)
*G05D 16/20* (2006.01)

(52) U.S. Cl.
CPC .......... *B60S 5/046* (2013.01); *B29C 73/025* (2013.01); *B60S 5/04* (2013.01); *G05D 16/2066* (2013.01)

(58) Field of Classification Search
CPC .......... B60S 5/046; B60S 5/04; B29C 73/025; B29C 73/166; G05D 16/2066; G05D 16/20

USPC ........................................................ 141/38
See application file for complete search history.

(56) References Cited

U.S. PATENT DOCUMENTS

| 5,611,875 A | * | 3/1997 | Bachhuber | ............ B60C 23/003 141/197 |
| 7,789,112 B1 | * | 9/2010 | Wise | ...................... B60S 5/046 141/95 |
| 9,914,271 B2 | | 3/2018 | Spindler et al. | |
| 2002/0130771 A1 | | 9/2002 | Osborne et al. | |

(Continued)

FOREIGN PATENT DOCUMENTS

| CN | 203 819 164 U |   | 9/2014 |
| CN | 204239179 U | * | 4/2015 |

(Continued)

OTHER PUBLICATIONS

CN-204239179-U English Translation of Specification (Year: 2020).*

(Continued)

*Primary Examiner* — Timothy P. Kelly
*Assistant Examiner* — Stephanie A Shrieves
(74) *Attorney, Agent, or Firm* — Pauley Erickson & Swanson

(57) ABSTRACT

A device and method for dispensing air and/or sealant to a tire of a vehicle. Power supply for the air compressor is obtained via powered USB instead of the typical 12 V cigarette lighter connector. The position of the tire which is being inflated can also be determined via the data interface of the USB port. By communication between compressor and the vehicle systems interface, the compressor can automatically switch off when the recommended tire pressure has been reached.

11 Claims, 2 Drawing Sheets

(56) References Cited

U.S. PATENT DOCUMENTS

| | | | | |
|---|---|---|---|---|
| 2005/0265873 | A1* | 12/2005 | Chou | F04B 35/06 |
| | | | | 417/552 |
| 2009/0218005 | A1* | 9/2009 | Stehle | B60S 5/043 |
| | | | | 141/38 |
| 2010/0189575 | A1* | 7/2010 | Yoshida | B29C 73/166 |
| | | | | 417/151 |
| 2010/0305809 | A1* | 12/2010 | Audisio | B60C 23/0408 |
| | | | | 701/31.4 |
| 2012/0224978 | A1* | 9/2012 | Ferber | B60S 5/04 |
| | | | | 417/44.1 |
| 2012/0283984 | A1* | 11/2012 | Peng | B60S 5/046 |
| | | | | 702/138 |
| 2013/0145834 | A1* | 6/2013 | Mouchet | B60C 23/0479 |
| | | | | 73/146.4 |
| 2015/0059918 | A1* | 3/2015 | Schondorf | B60C 23/0479 |
| | | | | 141/4 |
| 2019/0263363 | A1* | 8/2019 | McIntyre | F04B 35/06 |

FOREIGN PATENT DOCUMENTS

| | | |
|---|---|---|
| CN | 204 633 382 U | 9/2015 |
| DE | 10 2016 122 735 A1 | 5/2018 |

OTHER PUBLICATIONS

U.S. Patent Office, English language version of the International Search Report, Form PCT/ISA/210 for International Application PCT/US2019/037886, dated Aug. 13, 2019 (4 pages).

U.S. Patent Office, English language version of the Written Opinion of the International Searching Authority, Form PCT/ISA/237 for International Application PCT/US2019/037886, dated Aug. 13, 2019 (8 pages).

\* cited by examiner

VEHICLE TIRE INFLATION COMPRESSOR FOR POWERED DATA PORTS

CROSS REFERENCE TO RELATED APPLICATION

This application claims the benefit of U.S. Provisional Application Ser. No. 62/688,204, filed on 21 Jun. 2018. This U.S. Provisional Application is hereby incorporated by reference herein in its entirety and are made a part hereof, including but not limited to those portions which specifically appear hereinafter.

BACKGROUND OF THE INVENTION

Field of the Invention

This invention relates to a device for dispensing air and/or tire sealant by a pressure source, and more particularly a portable vehicle tire inflation device that can be powered via vehicle data ports.

Description of Prior Art

There are many different forms and designs of vehicle tire inflators known and currently available on the market. They are primarily used for introducing air and/or tire sealant into low pressure tires or damaged tires. Portable tire inflators are powered by the common 12 V direct current (DC) connectors, such as the ubiquitous cigarette lighter plug (e.g., as defined in ANSI/SAE J563) for the vehicle cigarette lighter receptacle or socket.

As vehicle technology and electronics improve, there is a continuing need or opportunity for improved vehicle accessories that interconnect with these new vehicle systems.

SUMMARY OF THE INVENTION

The present invention is directed to a device for dispensing air and/or sealant, such as a mini-compressor or inflator, with a pressure source powered and/or controlled through a data communication port and cord, such as a powered Universal Serial Bus (USB) and USB cord, instead of the usual 12 V connector (cigarette lighter). While suitable for various inflation needs, the device is particularly useful for portable or emergency vehicle dispensing/inflator devices, and is powered and/or controlled via the vehicle's data communication port e.g., USB).

In embodiments of this invention, during, inflation or dispensing, the status of the object inflated, e.g., the vehicle tire, can be monitored and/or determined via the data interface of the vehicle USB port. By communication between compressor and the vehicle electronics systems (e.g., RDC or ECU), the compressor can switch off when the recommended tire pressure has been reached.

In some embodiments of this invention, additional comfort functions can be realized, such as by help of the vehicle entertainment system. For example, the remaining filling time can be calculated and displayed on a screen of the inflator and/or via a vehicles user interface display. Or, depending on the course of the filling procedure, collective system can predict whether the tire can be repaired by help of the compressor. In case of need, help by a third party can be ordered without delay.

These and other benefits can be obtained by a device for dispensing air and/or sealant to a tire of a vehicle, that includes a pressure source, a dispenser outlet connected to the pressure source, a connector element, and a control module in communication with each of the connector element and the pressure source. The connector element, e.g., a data and/or power cord, is desirably configured to connect to a vehicle data communication port (e.g., USB or equivalent) to obtain inflation information and/or power. The data communication element desirably is a powered data communication port, whereby the control module can draw operational power for the dispensing device via the powered data communication port.

In embodiments of this invention, the control module obtains tire inflation values from a vehicle tire pressure monitoring system and/or other sensor systems, such as vehicle load sensors. The device can automatically operate (e.g., turn on) upon receiving a low tire inflation value from the vehicle tire pressure monitoring system, and automatically cease inflation upon automatically determining a proper inflation.

The invention further includes a method for dispensing air and/or sealant to a tire of a vehicle. The method includes connecting a tire inflation or repair device to the tire, connecting the tire repair device to a data communication port of the vehicle, and powering the tire repair device dispensing via the data communication port of the vehicle. The method can further include automatically monitoring and/or controlling a tire inflation via data provided to the tire repair device by the vehicle via the data communication port.

BRIEF DESCRIPTION OF THE DRAWINGS

The above-mentioned and other features and objects of this invention will be better understood from the following detailed description taken in conjunction with the drawings.

DESCRIPTION OF PREFERRED EMBODIMENTS

Figure 1:
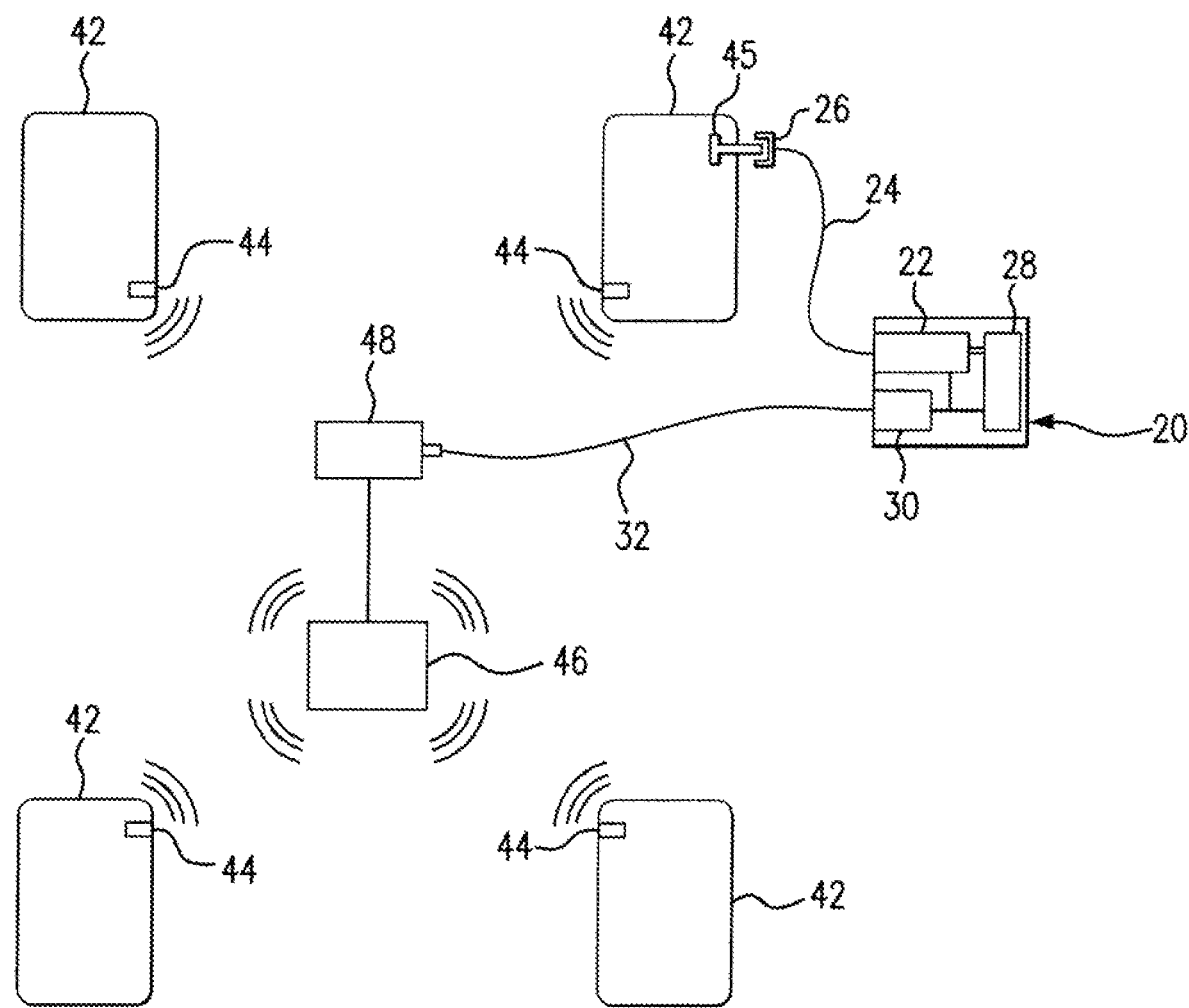
FIG. 1 is a representative illustration of a dispensing device according to embodiments of this invention in combination with a vehicle.

FIG. 1 illustrates a device 20 according to embodiments of this invention for dispensing air and/or tire sealant into tires 42 of vehicle 40. The vehicle 40 is representatively show as including four tires 42, each including a tire pressure monitoring system (TPMS) sensor 44. As currently known and implemented throughout the automotive industry, the TPMS sensors 44 communicate by any suitable connection, such as wirelessly, with the vehicle control computer system 46, such as the electronic control unit (ECU) or equivalent system or subsystem. The vehicle 40 further includes a data communications port 48, such as a powered USB port in combination with the computer system 46.

Device 20 includes a pressure source 22 that can be connected to the tire 44 by a dispenser outlet, shown as air hose 24 with any suitable end valve 26 to match the tire stem 45, such as a Schrader valve. The pressure source 22 is desirably embodied in the form of a compressor, and can optionally be paired with a sealant canister 28 for dispensing both air and tire sealant.

The device 20 further includes a module 30 configured to connect to the data communication port 48 of the vehicle 40 to power and/or control the pressure source 22. The module 30 connects via connector element 32 to obtain inflation information and/or power, such as a power and/or data cord. The connector element 32 has an end integrally connected (i.e., fixed) to the module 30, or can be a separate cord having a plug that fits into a corresponding socket in the device 20. Any suitable data and/or power connection can be used, depending on need and the vehicle components. Powered USB cords and sockets are preferred due to current inclusion within vehicle audio or other systems. Any suitable USB version and/or connector type, such as standard, mini, or micro Type A, B, or C, etc., can be used. As will be appreciated, other suitable data and/or power connectors such as Thunderbolt™ or Lightning™ cables, or combinations of any of the interfaces, can be used depending on need.

Embodiments of this invention use a powered USB or equivalent connection instead of the traditional and common 12V-DC-connectors, for supplying compressors with power. Additionally or alternatively (i.e., along with the traditional 12 V connector), data can be exchanged between the vehicle and dispensing device. In embodiments of this invention, the control module includes an integrated logical circuit, for example, to receive information about pressure and temperature originating from the tire pressure sensors and/or ECU. This information can be used as control parameters, such as to automatically control the device and the inflation process. The control algorithm(s) can optionally be executed on the vehicle systems, with the device receiving simple operational instructions (e.g., on off).

In embodiments of this invention, the communication between the vehicle's systems and the compressor device would render obsolete manual displays of pressure by a manometer on the compressor. The complete control of the compressor can be realized by the vehicle and compressor electronics. Manual on/off-switches could also be omitted, as the device automatically starts inflation as needed when connected and ceases inflation upon automatically determining a proper inflation. The ability to reduce pressure may also be omitted, because the compressor cannot overfill the tire due to the communication with the vehicle.

Figure 2:
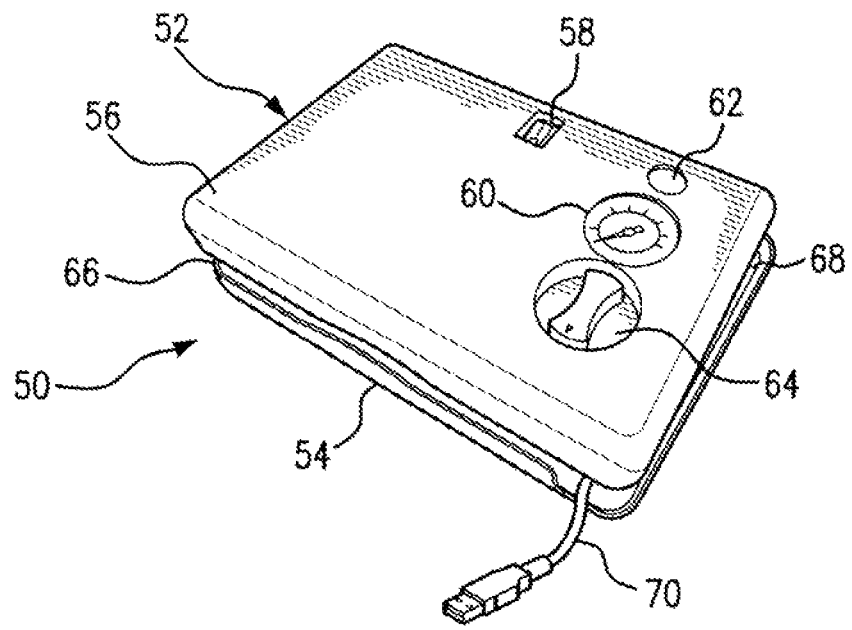
FIG. 2 illustrates a dispensing device according to one embodiment of this invention.

FIG. 2 shows a device 50 for dispensing air and/or tire sealant according to one embodiment of this invention. The device 50 can have internal components such as described in U.S. Pat. No. 9,914,271, herein incorporated by reference. The device 50 includes a housing 52 formed of a bottom receptacle 54 and a cover 56. The device of FIG. 2 shows a dispensing device, with traditional functional elements such as a switch 58 for switching the device on and off, a manometer 60 for measuring the pressure built up by the internal pressure source, a pressure release button 62 for releasing excess pressure, and a rotary switch 64 for actuating a valve for an optional sealant canister. Between the receptacle 54 and the cover 56, a circumferential slot 66 is provided into which a USB or equivalent cable 70 for powering or operating the device and/or a hose 68 for dispensing air and/or tire sealant can be wrapped and stored.

Figure 3:
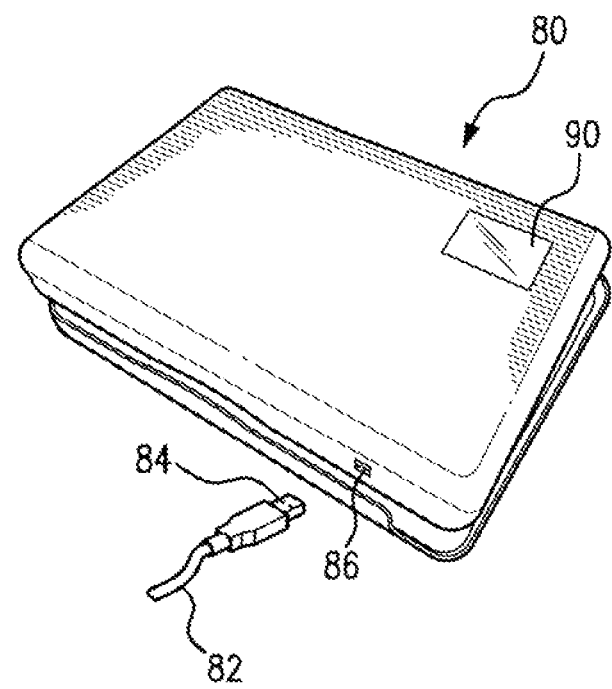
FIG. 3 illustrates a dispensing device according to another embodiment of this invention.

In FIG. 2, the USB cable 70 is fixed or integrated at one end to the device 50, similar to most current 12 V compressor power cords. FIG. 3 illustrates a further embodiment wherein the dispensing device 80 has a separate USB cord 82 that has a USB plug 84 that is removably attachable to a corresponding USB socket or receptacle 86 on the device 80 as the power supply port. The socket 86 is shown in a side wall of the housing, but can be placed anywhere on the device, such as the top surface, depending on need or other design considerations.

FIG. 3 also illustrates a device without the functional elements for the user operation shown in FIG. 2. The device of FIG. 3 operates automatically with the vehicle system(s) to turn the compressor and/or sealant on and off. The device 80 is shown only with an optional display screen 90, which can display information such as, without limitation, a pressure value, a remaining inflation time, warning messages, sealant amount, and/or other information.

The automated dispensing devices of this invention can include any necessary circuitry, data processors, memory components, encoded software instructions, and/or control algorithms to obtain vehicle and tire inflation data and values through the vehicle data communication port. The vehicle system(s) can additionally include necessary coordinating software, logic circuits, etc, to send information obtained from, or control instructions based upon, the TPMS and/or load sensors to the inflator for operation. In embodiments of this invention, the dispensing device can determine that a puncture needs sealing based upon a detected rate of inflation, or lack of expected inflation, and automatically dispense sealant.

Thus the invention provides a portable air and/or sealant dispensing device engineered for advances in vehicle systems. The dispensing devices of this invention reduce user error and allow for less manufacturing expense due to fewer required functional components.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

The invention claimed is:

1. A device for dispensing air and/or sealant to a tire of a vehicle, the device comprising:
   a pressure source;
   a dispenser outlet connected to the pressure source;
   a connector element; and
   a control module in communication with each of the connector element and the pressure source, wherein the connector element is configured to connect to a vehicle data communication port to obtain inflation information and power.

2. The device of claim 1, wherein the connector element comprises a powered data communication port, wherein the control module is configured to connect to and draw operational power via the powered data communication port.

3. The device of claim 1, wherein the connector element comprises a power supply cord having a plug that fits into the vehicle data communication port.

4. The device of claim 3, wherein power and inflation data are transferred from the vehicle data communication port to the device via the power supply cord.

5. The device of claim 1, wherein the control module obtains tire inflation values from a vehicle tire pressure monitoring system.

6. The device of claim 5, wherein the device automatically operates upon receiving a low tire inflation value from the vehicle tire pressure monitoring system, and automatically ceases inflation upon automatically determining a proper inflation.

7. The device of claim 1, wherein the control module comprises an integrated logic circuit.

8. The device of claim 1, wherein the vehicle data communication port is a powered universal serial bus (USB), and the connector element comprises at least one of USB cord or a corresponding powered USB.

9. The device of claim 8, further comprising a housing enclosing the pressure source and the control module, wherein the housing comprises the corresponding powered USB.

10. A method for dispensing air and/or sealant to a tire of a vehicle, the method comprising:
- connecting a tire repair device to the tire;
- connecting the tire repair device to a data communication port of the vehicle;
- powering the tire repair device dispensing via the data communication port of the vehicle;
- further comprising automatically monitoring and/or controlling a tire inflation via data provided to the tire repair device by the vehicle via the data communication port.

11. A device for dispensing air and/or sealant to a tire of a vehicle, the device comprising:
- a pressure source;
- a dispenser outlet connected to the pressure source;
- a connector element;
- a control module in communication with each of the connector element and the pressure source, wherein the connector element is configured to connect to a vehicle data communication port to obtain inflation information and power;
- wherein the vehicle data communication port is a powered universal serial bus (USB), and the connector element comprises at least one of a USB cord or a corresponding powered USB; and
- a housing enclosing the pressure source and the control module, wherein the housing comprises the corresponding powered USB.

* * * * *